United States Patent [19]

Inagaki et al.

[11] Patent Number: 5,676,433
[45] Date of Patent: Oct. 14, 1997

[54] DEVICE FOR ESTIMATING SIDE SLIDE VELOCITY OF VEHICLE COMPATIBLE WITH ROLLING AND CANT

[75] Inventors: Shoji Inagaki, Numazu; Mizuho Sugiyama, Toyota, both of Japan

[73] Assignee: Toyota Jidosha Kabushiki Kaisha, Aichi-ken, Japan

[21] Appl. No.: 731,915

[22] Filed: Oct. 22, 1996

[30] Foreign Application Priority Data

Oct. 25, 1995 [JP] Japan ................... 7-300686

[51] Int. Cl.$^6$ ................... B60T 8/00; B60T 8/56
[52] U.S. Cl. ................... 303/146; 364/426.016
[58] Field of Search ................... 303/146, 140, 303/147; 364/426.016; 180/197

[56] References Cited

U.S. PATENT DOCUMENTS

| | | | |
|---|---|---|---|
| 4,809,181 | 2/1989 | Ito et al. | 364/426.01 |
| 4,898,431 | 2/1990 | Karnopp et al. | 303/146 |
| 4,967,865 | 11/1990 | Schindler | 180/408 |
| 4,998,593 | 3/1991 | Karnopp et al. | 180/408 |
| 5,123,497 | 6/1992 | Yopp et al. | 180/422 |
| 5,155,686 | 10/1992 | Shiraishi et al. | 303/146 X |
| 5,255,194 | 10/1993 | Schaufelberger et al. | 364/426.016 |
| 5,576,959 | 11/1996 | Hrovat et al. | 303/146 X |

FOREIGN PATENT DOCUMENTS

| | | |
|---|---|---|
| 4-325357 | 11/1992 | Japan . |
| 5-139327 | 6/1993 | Japan . |
| 5-278624 | 10/1993 | Japan . |

Primary Examiner—Josie Ballato
Attorney, Agent, or Firm—Oliff & Berridge

[57] ABSTRACT

A device for estimating side slide velocity of a vehicle, comprising: a component for detecting longitudinal velocity of the vehicle body; a component for detecting yaw rate of the vehicle body about its center of gravity; a component for detecting lateral acceleration of the vehicle body at the center of gravity; and a component for integrating on time basis difference between the lateral acceleration detected by the lateral acceleration detection component and product of the yaw rate detected by the yaw rate detection component and the longitudinal velocity detected by the longitudinal velocity detection component such that only high frequency components thereof are integrated to produce a side slide velocity signal. The device may further comprise a component for estimating slip angle of at least either the front wheels or the rear wheels and converting the estimated slip angle into side slide velocity of the vehicle body at its center of gravity to produce a side slide velocity signal; and a component for summing the side slide velocity signal produced by the integration component and the side slide velocity signal produced by the slip angle estimation and conversion component to produce a final side slide velocity signal.

5 Claims, 3 Drawing Sheets

DEVICE FOR ESTIMATING SIDE SLIDE VELOCITY OF VEHICLE COMPATIBLE WITH ROLLING AND CANT

BACKGROUND OF THE INVENTION

1. Field of the Invention

The present invention relates to a device for estimating side slide velocity of a vehicle such as an automobile.

2. Description of the Prior Art

The vehicle stability control aimed at improving stability of running behavior of the vehicle, particularly the stability thereof against spin and drift-out during turn driving along a curved course or in driving on an irregularly slippery road, is receiving high attention of automobile engineers. In conducting such vehicle stability controls, it is generally required to know side slide velocity of the vehicle body.

Conventionally, the side slide velocity is most conveniently obtained from lateral acceleration, yaw rate and longitudinal velocity of the vehicle body such that difference between the lateral acceleration and product of the yaw rate and the longitudinal velocity, i.e. side slide acceleration, is integrated on time basis. These parameters are available from sensors each having relatively simple construction. Particularly with reference to the lateral acceleration sensor, it is convenient to employ a pendulum element responsive to lateral acceleration under biasing to zero position by gravity.

However, when the lateral acceleration sensor has such a construction, the lateral acceleration detected by the sensor includes apparent acceleration components due to a rolling of the vehicle body and a cant of road surface, in addition to certain generally unavoidable perpetual offset of the device. Therefore, when the difference between the lateral acceleration and the product of yaw rate and longitudinal velocity is integrated on time basis, a larger error can occur in the estimation of the side slide velocity due to accumulation of errors based upon apparent acceleration components.

SUMMARY OF THE INVENTION

In view of the above, it is a primary object of the present invention to provide a device for estimating side slide velocity of a vehicle such as an automobile at higher precision, particularly against rolling of the vehicle body and cant of road surface.

In order to accomplish the above-mentioned primary object, the present invention proposes a device for estimating side slide velocity of a vehicle having a vehicle body and front and rear wheels, comprising:

a means for detecting longitudinal velocity of the vehicle body;

a means for detecting yaw rate of the vehicle body about a center of gravity thereof;

a means for detecting lateral acceleration of the vehicle body at the center of gravity thereof; and a means for integrating on time basis difference between the lateral acceleration detected by said lateral acceleration detection means and product of the yaw rate detected by said yaw rate detection means and the longitudinal velocity detected by said longitudinal velocity detection means such that only high frequency components thereof are integrated to produce a side slide velocity signal.

The lateral acceleration component due to a rolling of the vehicle body or a cant of road surface is considered to be of low frequency as compared with the lateral acceleration due to the running instability of the vehicle which is to be controlled by the stability control devices incorporating the side slide velocity estimation device of the present invention. By the difference between lateral acceleration and product of yaw rate and longitudinal velocity being integrated in a high pass filtering manner that only high frequency components thereof are integrated, the side slide velocity signal thus obtained is made free of the influence of rolling of the vehicle body or cant of the road surface.

On the other hand, however, it is considered that a low frequency side slide velocity will also be desired in controlling the vehicle against a more slowly progressive instability, particularly anticipated to occur in drift-out. In view of this, it is a more focused object of the present invention to provide a device for estimating side slide velocity of a vehicle such as an automobile at higher precision, particularly against rolling of the vehicle body and cant of road surface, with a compensation of estimating low frequency side slide components, without increasing error due to the integration calculation of apparent acceleration components.

In order to accomplish the above-mentioned more focused object, the present invention proposes a device for estimating side slide velocity of a vehicle having a vehicle body and front and rear wheels, comprising:

a means for detecting longitudinal velocity of the vehicle body;

a means for detecting yaw rate of the vehicle body about a center of gravity thereof;

a means for detecting lateral acceleration of the vehicle body at the center of gravity thereof;

a means for integrating on time basis difference between the lateral acceleration detected by said lateral acceleration detection means and product of the yaw rate detected by said yaw rate detection means and the longitudinal velocity detected by said longitudinal velocity detection means such that only high frequency components thereof are integrated to produce a first side slide velocity signal;

a means for estimating slip angle of at least either the front wheels or the rear wheels and converting the estimated slip angle into side slide velocity of the vehicle body at the center of gravity thereof to produce a second side slide velocity signal; and a means for summing said first and second side slide velocity signals to produce a final side slide velocity signal.

By estimating slip angle of at least either the front wheels or the rear wheels and converting the estimated slip angle into side slide velocity of the vehicle body at the center of gravity thereof, an estimation of side slide velocity of the vehicle body is available based upon the lateral acceleration detected by said lateral acceleration detection means without going through integration of the lateral acceleration, and therefore, an accumulation of the low frequency apparent components included in the detected lateral acceleration is avoided.

In this connection, it is contemplated that, although the slip angle of the front or rear wheels is, since it is estimated based upon the lateral acceleration detected by said lateral acceleration detection means, immune to high frequency irregularities of road surface conditions, it is more desirable that said second side slide velocity signal is processed through a low pass filter so that only low frequency components are compensated for, without doubling on or interfering with the high frequency components estimated as said first side slide velocity.

BRIEF DESCRIPTION OF THE DRAWING

In the accompanying drawing.

DESCRIPTION OF THE PREFERRED EMBODIMENT

In the following, the present invention will be described in more detail with respect to an embodiment thereof with reference to the accompanying drawing.

Figure 1:
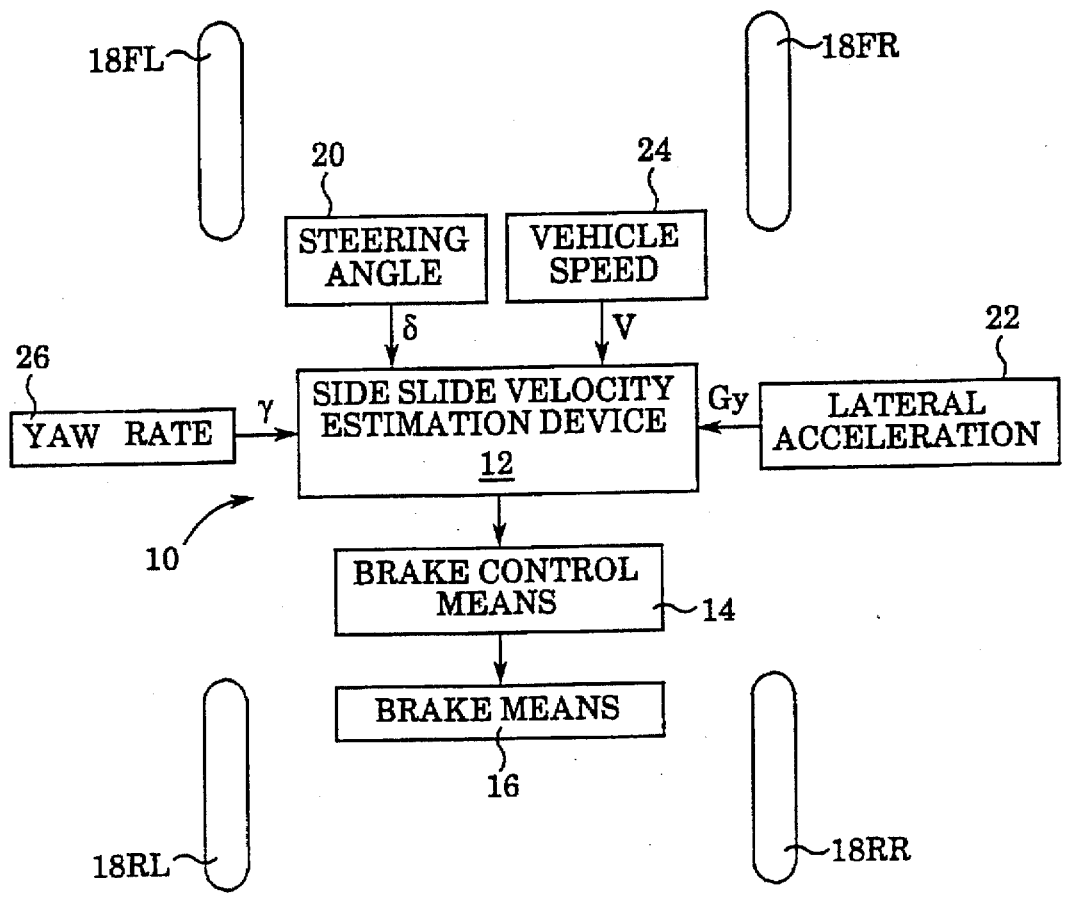
FIG. 1 is a diagrammatic illustration of a vehicle in which the side slide velocity estimation device according to the present is incorporated in the form of an embodiment together with a brake control means and a brake means for carrying out a vehicle stability control.

Referring first to FIG. 1, the side slide velocity estimation device 12 according to the present invention is incorporated in a vehicle 10 diagrammatically illustrated by front left, front right, rear left and rear right wheels 18FL, 18FR, 18RL and 18RR. The block of the side slide velocity estimation device 12 may be deemed to also represent the body of the vehicle, if necessary. The side slide velocity estimation device 12 is supplied with various signals such as a signal representing steering angle $\delta$ of the front wheels 18FL and 18FR from a steering angle sensor 20, a signal representing vehicle speed V to be used as the longitudinal velocity of the vehicle body from a vehicle speed sensor 24, a signal representing yaw rate $\gamma$ from a yaw rate sensor 26, and a signal representing lateral acceleration Gy of the vehicle body from a lateral acceleration sensor 22. The vehicle is equipped with a brake control means 14 which conducts certain stability control calculations based upon various signals including the signal of side slide velocity of the vehicle body received from the side slide velocity estimation device 12, and controls brake means 16 so as to apply controlled braking to selected one or ones of the wheels 18FL–18RR for certain vehicle stability control.

Figure 2:
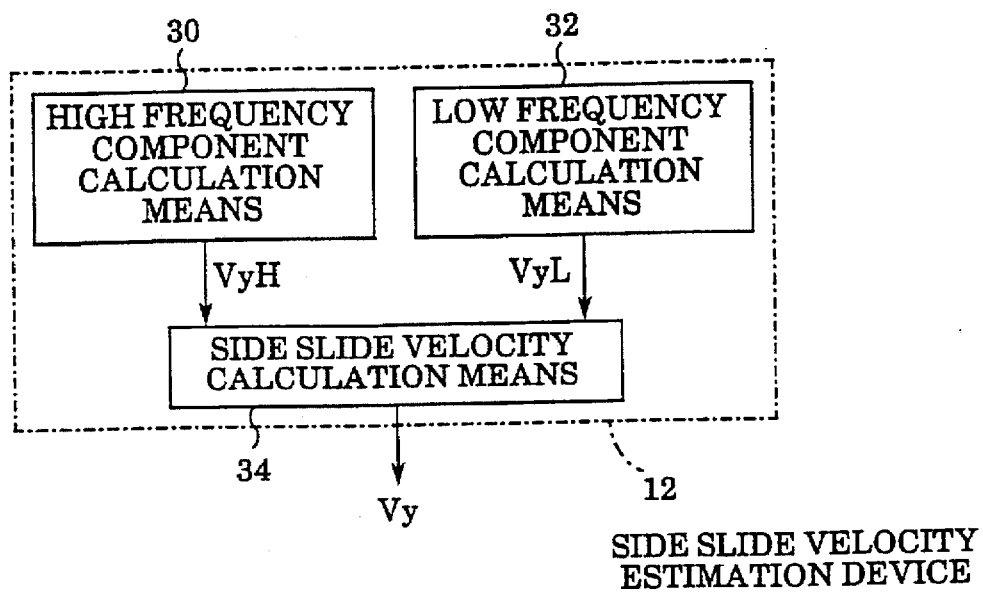
FIG. 2 is a diagrammatic illustration of a further detail of the side slide velocity estimation device shown in FIG. 1.

As shown in FIG. 2, the side slide velocity estimation device 12 according to this embodiment comprises a high frequency component calculation means 30 for calculating high frequency components of side slide velocity of the vehicle body, a low frequency component calculation means 32 for calculating low frequency components of side slide velocity of the vehicle body, and a side slide velocity calculation means 34 for calculating a final side slide velocity to be estimated by the side slide velocity estimation device 12 based upon signal VyH received from the high frequency component calculation means 30 and signal VyL received from the low frequency component calculation means 32, as described in detail hereinbelow.

Figure 3:
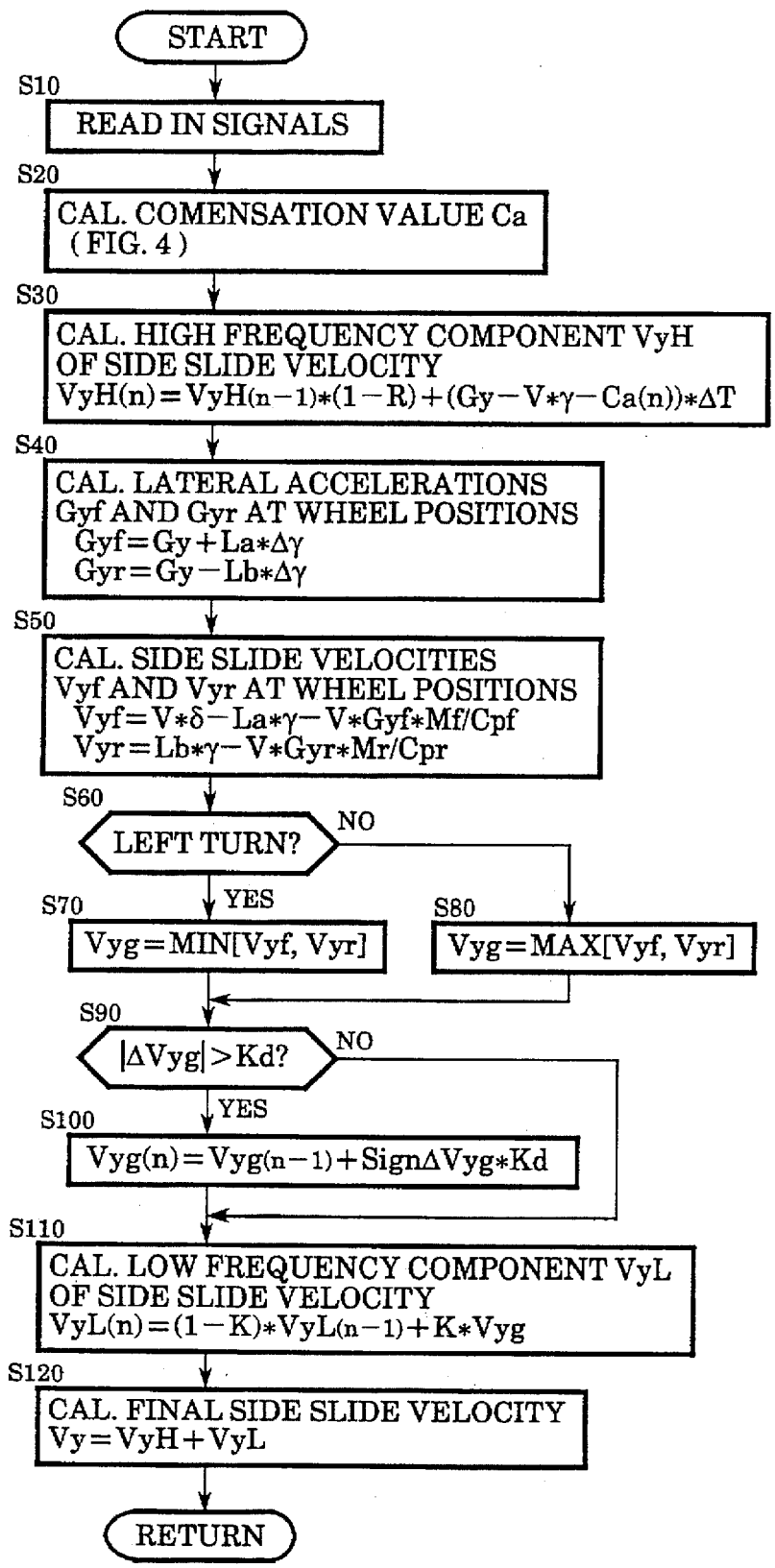
FIG. 3 is a flowchart showing an embodiment of the calculation process conducted by the device of the present invention.
Figure 4:
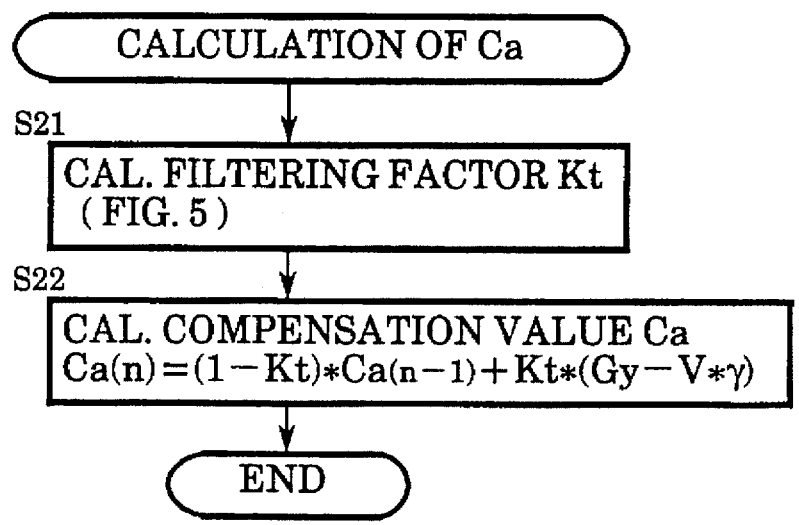
FIG. 4 is a flowchart showing a part of the calculation process of FIG. 3 in more detail.
Figure 5:
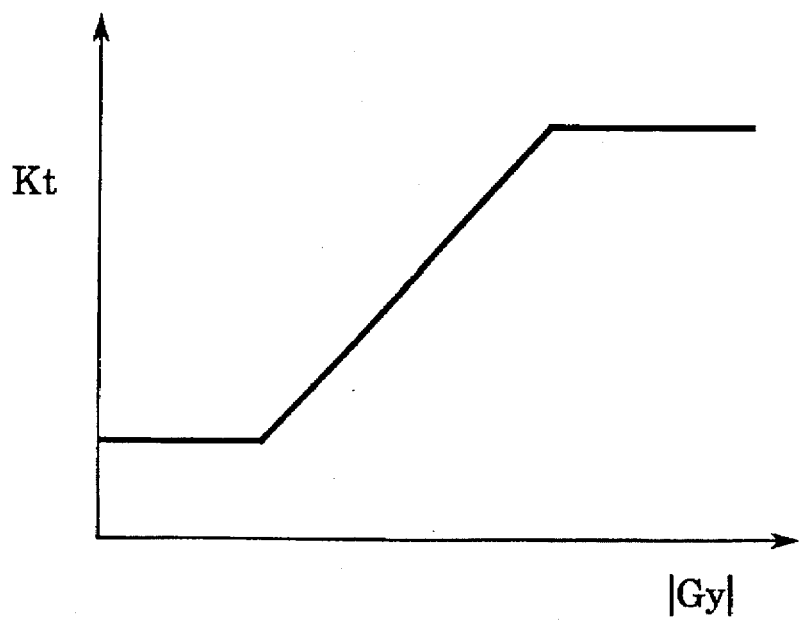
FIG. 5 is a map for referring to in the process of FIG. 4.

Referring to FIGS. 3–5, the present invention will be described from the aspect of operation thereof.

The calculation operation shown in the flowchart of FIG. 3 is started by an ignition switch (not shown) of the vehicle in which the present device is installed being closed, so as to be cyclically repeated at a cycle time such as tens of micro-seconds. In step 10, signals such as steering angle $\delta$ and others are read in. Then in step 20, a compensation amount Ca is calculated. The detail of this parameter is described later with reference to FIG. 4.

In step 30, the production of the signal VyH output from the high frequency component calculation means 30 is carried out as follows:

When a vehicle is driven along a curved course with no side sliding, lateral acceleration Gy should conform to product of vehicle speed V and yaw rate $\gamma$, i.e. $Gy=V*\gamma$. Therefore, by detecting difference $Gy-V*\gamma$, and integrating this difference on time basis, side slide velocity of the vehicle is to be obtained. However, as already described, the value of lateral acceleration Gy detected by a conventional sensor includes apparent acceleration components due to a rolling of the vehicle body, a cant of road surface, perpetual offset of the sensor, etc. Therefore, if $Gy-V*\gamma$ is directly integrated, the integration will overflow, and a correct estimation of lateral acceleration is not available. Therefore, $Gy-V*\gamma$, is integrated as follow:

$$VyH(n)=VyH(n-1)*(1-R)+(Gy-V*\gamma-Ca(n))*\Delta T \quad (1)$$

In formula 1, VyH (n) is the side slide velocity to be obtain through a cyclic calculation of formula 1 by a cycle time $\Delta T$. VyH (n−1) is the value in the previous cycle corresponding to VyH (n). As well known in the art as a digital approximation of integration, by accumulating $(Gy-V*\gamma)$ at time interval $\Delta T$, $(Gy-V*\gamma)$ is integrated on time basis, wherein, however, by subtracting an amount VyH (n−1)*R each time, integration of certain low frequency components, such as those due to a rolling of the vehicle body, a cant of road surface and perpetual offsets of the lateral acceleration sensor, yaw rate sensor and longitudinal speed sensor, is canceled such that no undue overflow of integration occurs due to accumulation of those low frequency components. This is essentially equivalent to a high pass filtration of $(Gy-V*\gamma)$ based upon an appropriate determination of the magnitude of R in relation to the oscillatory variation of the value of $(Gy-V*\gamma)$. Thus, by using VyH as an output signal of the side slide velocity estimation device, the above-mentioned primary object is accomplished.

A further improvement of the above approximation integration is available when a compensation amount Ca reflecting on the cant of the road surface is incorporated as shown in formula 1. To obtain Ca, referring to FIG. 4, in step 21, a map such as shown in FIG. 5 is looked at with the absolute value of Gy for obtaining a filtering factor Kt for designing the effect of the cant based upon the magnitude of lateral acceleration. Then in step 22, the value of Ca is cyclically modified based upon $(Gy-V*\gamma)$ according to the value of Kt as follow:

$$Ca(n)=(1-Kt)*Ca(n-1)+Kt*(Gy-V*\gamma) \quad (2)$$

By such a compensation amount Ca being subtracted from $(Gy-V*\gamma)$ before the integration of $(Gy-V*\gamma)$, the effect of road cant is desirably canceled from the side slide velocity signal obtained.

In stop 40, in order to make the second estimation of the side slide velocity, denoting longitudinal distances between the center of gravity of the vehicle body and the axes of the front and rear wheels as La and Lb, respectively, and yaw acceleration, i.e. differential of yaw rate ), as $\gamma$ as $\Delta\gamma$, the lateral acceleration at the front and rear wheels, Gyf and Gyr, are calculated as follows:

$$Gyf=Gy+La*\Delta\gamma \quad (3)$$

$$Gyr=Gy-Lb*\Delta\gamma \quad (4)$$

Then, in step 50, the following calculations are made:

$$Vyf=V*\delta-La*\gamma-V*Gyf*Mf/Cpf \quad (5)$$

$$Vyr = Lb*\gamma - V*Gyr*Mr/Cpr \qquad (6)$$

Formulae 5 and 6 are obtained from the following relationships:

$$\alpha f = \delta - (Vy/V) - La*(\gamma/V) \qquad (7)$$

$$\alpha r = -(Vy/V) + Lb*(\gamma/V) \qquad (8)$$

In formulae 7 and 8, αf and αr are slip angles of the front and rear wheels, respectively, and δ is steering angle of the front wheels, based upon the assumption that the vehicle is steered at the front wheels. These formulae give the relationship between the side slide velocity Vy of the vehicle body at the center of gravity thereof and the slip angles αf and αr of the front and rear wheels, respectively. Theoretically, Vy calculated by formula 7 should conform to Vy calculated by formula 8. By rewriting formulae 7 and 8, Vy is calculated as follows:

$$Vy = V*\delta - La*\gamma - V*\alpha f \qquad (9)$$

$$Vy = Lb*\gamma - V*\alpha r \qquad (10)$$

Since the slip angles αf and αr are not directly detectable, these are estimated as follows:

$$\alpha f = Ff/Cpf \qquad (11)$$

$$\alpha r = Fr/Cpr \qquad (12)$$

In formulae 11 and 12, Cpf and Cpr are the cornering powers of the front and rear wheels, respectively, and Ff and Fr are side forces applied to the front and rear wheels, respectively, which are estimated as follows:

$$Ff = Mf*Gyf \qquad (13)$$

$$Fr = Mr*Gyr \qquad (14)$$

In formulae 13 and 14, Mf and Mr are shares of the total mass of the vehicle body estimated to be supported by the front and rear wheels, respectively.

Thus, substituting Ff and Fr of formulae 11 and 12 by formulae 13 and 13, and further substituting αf and αr of formulae 9 and 10 by formulae 11 and 12, respectively, and then rewriting Vy deducted from the front wheels as Vyf and Vy deducted from the rear wheels as Vyr, the relationships shown by formulae 5 and 6 are obtained.

It is to be noted that Vyf and Vyr will generally no longer conform to one another, because the assumption by formulae 11 and 12 was incorporated such that the side forces acting at the wheels are each proportional to the slip angle, although this assumption is lost as the slip angle increases.

In step 60, it is judged if the vehicle is making a left turn. When the answer is yes, the control proceeds to step 70, whereas when the answer is no, the control proceeds to step 80, where it is assumed that the vehicle is making a right turn, as the stability controls herein concerned are generally conducted to stabilize the turn behavior of the vehicle.

In stop 70, the notation means that either Vyf or Vyr having a smaller value is selected for use, as Vyg. This selection is made to use either Vyf or Vyr having a smaller value, in view of the assumption introduced by formulae 11and 12, from which it is estimated that the smaller one of Vyf and Vyr is less departed from the linearity of side force vs. slip angle of wheel, and is therefore more correct. In step 80, the notation means that either Vyf or Vyr having a larger value is selected. This inversion against step 70 is only due to the mathematical convenience that the parameters having direction of turn are made positive for left turn and negative for right turn.

In step 90, it is judge if the absolute value of ΔVyg, i.e. the change of Vyg in the current calculation cycle from the previous calculation cycle, is greater than a limit value Kd provided for the purpose of restricting the calculation against overflowing. When the answer is yes, then in step 100 the change of Vyg is limited to the magnitude of Kd. In the notation of step 100, "Sign ΔVyg" means the positive/ negative sign of ΔVyg. When the answer of 90 is no, step 100 is bypassed.

In step 110, the side slide velocity Vyg thus obtained is treated for filtering out certain low frequency components thereof for use, by appropriately determining filtering factor K, as follow:

$$VyL(n) = (1-K)*VyL(n-1) + K*Vyg \qquad (15)$$

The side slide velocity VyL thus obtained represents low frequency components of the side slide velocity of the vehicle body at the center of gravity thereof, to be responsive to a slow side sliding of the vehicle body such as in a gradual drift-out, without causing overflow of the signal, as no time-based integration is incorporated therein.

Then, in step 120, the side slide velocity signal for output is calculated as follows:

$$Vy = VyH + VyL \qquad (16)$$

Thus, by using Vy thus obtained as the output signal of the side slide velocity estimation device, the above-mentioned more focused object of the present invention is accomplished.

It will be noted that the side slide velocity estimation device of the present invention may be constructed to calculate only Vyf or Vyr instead of calculating both of these two so as to provide the final output signal as a sum of VyH and VyL, the latter being obtained only from calculation of either Vyf or Vyr.

Although the invention has been described in detail with respect to a particular embodiment thereof, it will be apparent for those skilled in the art that various modifications are possible with respect to the shown embodiment without departing from the spirit of the present invention.

We claim:

1. A device for estimating side slide velocity of a vehicle having a vehicle body and front and rear wheels, comprising:

a means for detecting longitudinal velocity of the vehicle body;

a means for detecting yaw rate of the vehicle body about a center of gravity thereof;

a means for detecting lateral acceleration of the vehicle body at the center of gravity thereof; and a means for integrating on time basis difference between the lateral acceleration detected by said lateral acceleration detection means and product of the yaw rate detected by said yaw rate detection means and the longitudinal velocity detected by said longitudinal velocity detection means such that only high frequency components thereof are integrated to produce a side slide velocity signal.

2. A device according to claim 1, further comprising:

a means for estimating slip angle of at least either the front wheels or the rear wheels and converting the estimated slip angle into side slide velocity of the vehicle body at the center of gravity thereof to produce a side slide velocity signal; and a means for summing said side slide velocity signal produced by said integration means and said side slide velocity signal produced by said slip angle estimation and conversion means to produce a final side slide velocity signal.

3. A device according to claim 2, further comprising a means for low pass filtering said side slide velocity signal produced by said slip angle estimation and conversion means so that only low frequency components thereof are filtered out before being summed with said side slide velocity signal produced by said integration means.

4. A device according to claim 1, further comprising a mean for estimating a compensation amount for cant of road surface based upon the lateral acceleration so that said cant compensation amount is subtracted from said difference between the lateral acceleration and the product of the yaw rate and the longitudinal velocity before being integrated.

5. A device according to claim 1, wherein said vehicle body has a mass deemed to consist of a front share herein denoted as Mf and supported by said front wheels and a rear share herein denoted as Mr and supported by said rear wheels, said front wheels being steered and longitudinally distant from a center of gravity of said vehicle body by a distance herein denoted as La and exhibiting a cornering power herein denoted as Cpf, said rear wheels being longitudinally distant from the center of gravity of said vehicle body by a distance herein denoted as Lb and exhibiting a cornering power herein denoted as Cpr, said longitudinal velocity of the vehicle body being herein denoted as V, said yaw rate of the vehicle body being herein denoted as $\gamma$, said lateral acceleration of the vehicle body being herein denoted as Gy, comprising:

a means for calculating differential of the yaw rate detected by said yaw rate detection means to be herein denoted as $\Delta\gamma$;

a means for detecting steering angle of the steered front wheels to be herein denoted as $\delta$;

a means for calculating:

$$Gyf = Gy + La * \Delta\gamma$$

$$Gyr = Gy - Lb * \Delta\gamma$$

$$Vyf = V*\delta - La*\gamma - V*Gyf*Mf/Cpf$$

and $$Vyr = Lb*\Delta\gamma - V*Gyr*Mr/Cpr$$

a means for selecting either Vyf or Vyr which is smaller in the absolute value thereof;

a means for low pass filtering selected Vyf or Vyr to provide a side slide velocity signal; and a means for summing said side slide velocity signal produced by said integration means and said side slide velocity signal produced by said low pass filtering means to produce a final side slide velocity signal.

* * * * *